No. 734,457. Patented July 21, 1903.

UNITED STATES PATENT OFFICE.

ERNST WILHELM ENGELS, OF DUSSELDORF, GERMANY.

PROCESS OF MAKING BRICKS OR BODIES FOR REFRACTORY LININGS OR OTHER USES.

SPECIFICATION forming part of Letters Patent No. 734,457, dated July 21, 1903.

Original application filed March 8, 1900, Serial No. 7,817. Divided and this application filed February 11, 1903. Serial No. 142,926. (No specimens.)

*To all whom it may concern:*

Be it known that I, ERNST WILHELM ENGELS, a citizen of Germany, residing at Dusseldorf, Germany, have invented certain new and useful Improvements in Processes of Making Bricks or Bodies for Refractory Linings or other Uses, of which the following is a specification.

This invention relates to the processes of making bricks or bodies for refractory linings and other uses and the product thereof; and the objects and advantages of the same will appear hereinafter.

This application is a division and continuation of my original application filed March 8, 1900, Serial No. 7,817.

It has been proposed heretofore to use carborundum mixed with a binding agent, which in a plastic form is molded into suitable form and subsequently dried to produce a homogeneous structure of that material.

So far as I am aware, it is new in the present invention to employ carborundum and a binding agent as a coating for a less refractory body, exemplified by burned brick, and which is applied in the manner to be hereinafter stated.

It is the main object of the present invention to provide a refractory coating or covering of a homogeneous nature for fire-bricks or other refractory bodies which is so applied to the brick or body as that after the firing or burning of the brick the coating or covering will be highly tenacious—that is to say, it adheres so firmly to the surface of the brick or body that it will not readily crack or separate therefrom. This is due to the physical qualities of the carborundum coating and it is extremely strong and not brittle.

Carborundum in a coating or covering in accordance with the present invention efficiently protects the inner core, is absolutely proof against and excludes the pyrochemical action of gases, is not influenced injuriously by changes of temperature, and is insensible to flying ashes, and therefore cannot form an objectionable slag, and in consequence of these advantages carborundum as applied in the present process to form a coating is the ideal, as well as the most practical, material for the purpose.

For carrying out the present process for the production of bricks or bodies for refractory linings and other uses I first make a mixture of the carborundum and water-glass or other suitable binding agent. In forming the mixture of carborundum and the binding agent the carborundum is naturally, of course, thoroughly incorporated, so that a homogeneous mass is formed. This wet mixture is then intimately applied in its wet state to the surface of the relatively less refractory body exemplified by brick. Finally to remove the moisture the brick or other body is dried, so that the coating of carborundum relieved from the moisture adheres in a substantially dry state, and when the composite structure is subjected to high temperature it will be intimately united and a hard or refractory surface produced, which does not readily crack or separate from the body portion.

The present invention takes advantage of the physical condition of the carborundum, which has not as yet been recognized for this purpose—namely, the fact that the manufactured carborundum is produced in the finely-divided condition, which readily facilitates spreading it on the surface of the brick or other body to be coated.

As compared with other fireproof materials of which I am aware caborundum can be applied in a very thin layer.

I am aware that prior to my invention it has been proposed in a number of instances to form a mixture of some refractory materials other than carborundum with a binding agent, which are applied as a coating to a fire-brick or the like, and I do not, therefore, broadly claim the same.

I am aware that United States Patent No. 628,288 has been issued to one Benjamin Talbot describing a brick or lining-block consisting throughout of a composition of carborundum and a binding material. This is distinguished from my invention by the fact that the Talbot patent neither discloses nor claims the principle of protecting a brick or a furnace-lining by merely coating it or painting it with a thin layer or enamel made of carborundum, nor is it asserted that any such discovery or principle was known to that inventor. Under my invention where the wet coating is as thin as one-half a millimeter, which is frequently the case, this coating after the lining has been in use in a furnace for several months is found to be not only intact and enamel-like in appearance, but also appears to have penetrated or else some of its dark-colored constituents have penetrated several millimeters into the material of the fire-brick itself. Probably the carborundum travels or penetrates into the material of the fire-brick, as it is only by some such supposition as this that I can account for the fact, for at the temperatures involved carborundum by itself is infusible.

The brick or lining produced by this process being a separate invention forms the subject-matter of a separate divisional application.

Having thus described my invention and distinguished the same from what is old prior thereto, what I claim, and desire to secure by Letters Patent, is—

1. The process for the production of bricks or bodies for refractory linings and other uses, which consists in commingling carborundum, with a binding material, and then applying said mixture in a wet state intimately to the surface of a relatively less refractory brick or lining-body, and finally evaporating the moisture to cause the coating to adhere in a substantially dried state, whereby, when the composite structure is subjected to high temperature, the coating and the brick or lining will be intimately united and a hard refractory surface produced, which does not readily crack or separate from the body portion, substantially as described.

2. The process for producing a brick or furnace-lining having a refractory surface containing carbid of silicon or carborundum, which consists in first coating the surface that is to be protected with a wet coating of carborundum and a binding agent, then drying the same, and finally subjecting the brick or lining and its coating to heat, whereby the carborundum is intimately incorporated with the substance of the brick or lining to form a refractory surface upon the same.

In testimony whereof I have signed this specification in the presence of two subscribing witnesses.

ERNST WILHELM ENGELS.

Witnesses:
WILLIAM ESSENWEIN,
PETER LIEBER.